United States Patent
Chen et al.

(10) Patent No.: US 12,394,204 B2
(45) Date of Patent: Aug. 19, 2025

(54) TAG FOR INDICATING A REGION OF INTEREST AND METHOD FOR FINDING A REGION OF INTEREST IN AN IMAGE

(71) Applicant: Axis AB, Lund (SE)

(72) Inventors: Jiandan Chen, Lund (SE); Haiyan Xie, Lund (SE)

(73) Assignee: Axis AB, Lund (SE)

( * ) Notice: Subject to any disclaimer, the term of this patent is extended or adjusted under 35 U.S.C. 154(b) by 339 days.

(21) Appl. No.: 17/526,126

(22) Filed: Nov. 15, 2021

(65) Prior Publication Data

US 2022/0180105 A1    Jun. 9, 2022

(30) Foreign Application Priority Data

Dec. 4, 2020    (EP) .................................. 20211939

(51) Int. Cl.
*G06V 20/52*    (2022.01)
*G06K 7/14*    (2006.01)
(Continued)

(52) U.S. Cl.
CPC ........... *G06V 20/52* (2022.01); *G06K 7/1417* (2013.01); *G06V 10/255* (2022.01); *G06V 20/46* (2022.01); *G06V 20/80* (2022.01); *G06V 20/95* (2022.01)

(58) Field of Classification Search
CPC ...... G06V 20/52; G06V 10/255; G06V 20/46; G06V 20/80; G06V 20/95; G06V 10/225;
(Continued)

(56) References Cited

U.S. PATENT DOCUMENTS 9,940,525 B2    4/2018  Wolf
11,553,969 B1 *    1/2023  Lang ..................... G06T 7/0012
(Continued)

FOREIGN PATENT DOCUMENTS

EP            3096290 A1    11/2016
KR    10-2016-0135643 A    11/2016

OTHER PUBLICATIONS

QR Code Data Representation for Mobile Augmented Reality by Hyoseok Yoon, Nyhyoung Park, Wonwoo Lee, Youngkyoon Jang and Woontack Woo, International AR Standards Meeting—Feb. 17-19, 2011 (Year: 2011).*

(Continued)

*Primary Examiner* — Nay A Maung
*Assistant Examiner* — Heath E. Wells
(74) *Attorney, Agent, or Firm* — Volpe Koenig

(57) ABSTRACT

A tag for indicating a region of interest, ROI, has a predefined format and codes ROI information, which is readable by imaging the tag and which includes a size indication and a relative position indication, the respective indications allowing the ROI's size and position to be determined relative to the tag's size and position. A method for locating a ROI in an image comprises: obtaining an image; searching in the image for a tag with the predefined format; and determining a ROI on the basis of the tag's size and position in the image and the ROI information. A method for generating a tag comprises: obtaining an image including a visible provisional tag of same physical size as the tag to be generated; obtaining operator input identifying a ROI in the image; deriving the size indication and relative position indication; and printing the tag.

12 Claims, 4 Drawing Sheets

(51) Int. Cl.
  *G06V 10/20* (2022.01)
  *G06V 20/00* (2022.01)
  *G06V 20/40* (2022.01)
  *G06V 20/80* (2022.01)
(58) Field of Classification Search
  CPC .... G06V 10/25; G06K 7/1417; G06K 7/1443; G06T 2207/20132; G06T 2207/30204; G06T 7/73; H04N 19/167; H04N 21/4728
  USPC .......................................................... 382/103
  See application file for complete search history.

(56) References Cited

U.S. PATENT DOCUMENTS

| | | | | |
|---|---|---|---|---|
| 2010/0182447 | A1* | 7/2010 | Namba | H04N 5/272 |
| | | | | 348/222.1 |
| 2017/0018058 | A1* | 1/2017 | Spinelli | G01S 13/89 |
| 2017/0284800 | A1 | 10/2017 | Schoner et al. | |
| 2017/0300757 | A1* | 10/2017 | Wolf | G06T 7/90 |
| 2020/0098096 | A1 | 3/2020 | Moloney | |
| 2020/0104623 | A1* | 4/2020 | Jhang | G06V 10/54 |
| 2021/0241469 | A1* | 8/2021 | Alessandrini | G06V 30/19133 |

OTHER PUBLICATIONS

"Security—Prevent QR code from being copied an QR code should be scanable by my mobile app only—Stack Overflow," Available at: https://stackoverflow.com/questions/31532752/prevent-qr-code-from-being-copi (Jun. 15, 2020).

Yoon et al., "QR code data representation for mobile augmented reality," International AR Standards Meeting (Feb. 17-19, 2011).

Park et al., "Barcode-Assisted Planar Object Tracking Method for Mobile Augmented Reality," 2011 International Symposium on Ubiquitous Virtual Reality, pp. 40-43, (2011).

Partial European Search Report dated May 20, 2021 for European Patent Application No. 20211939.2.

* cited by examiner

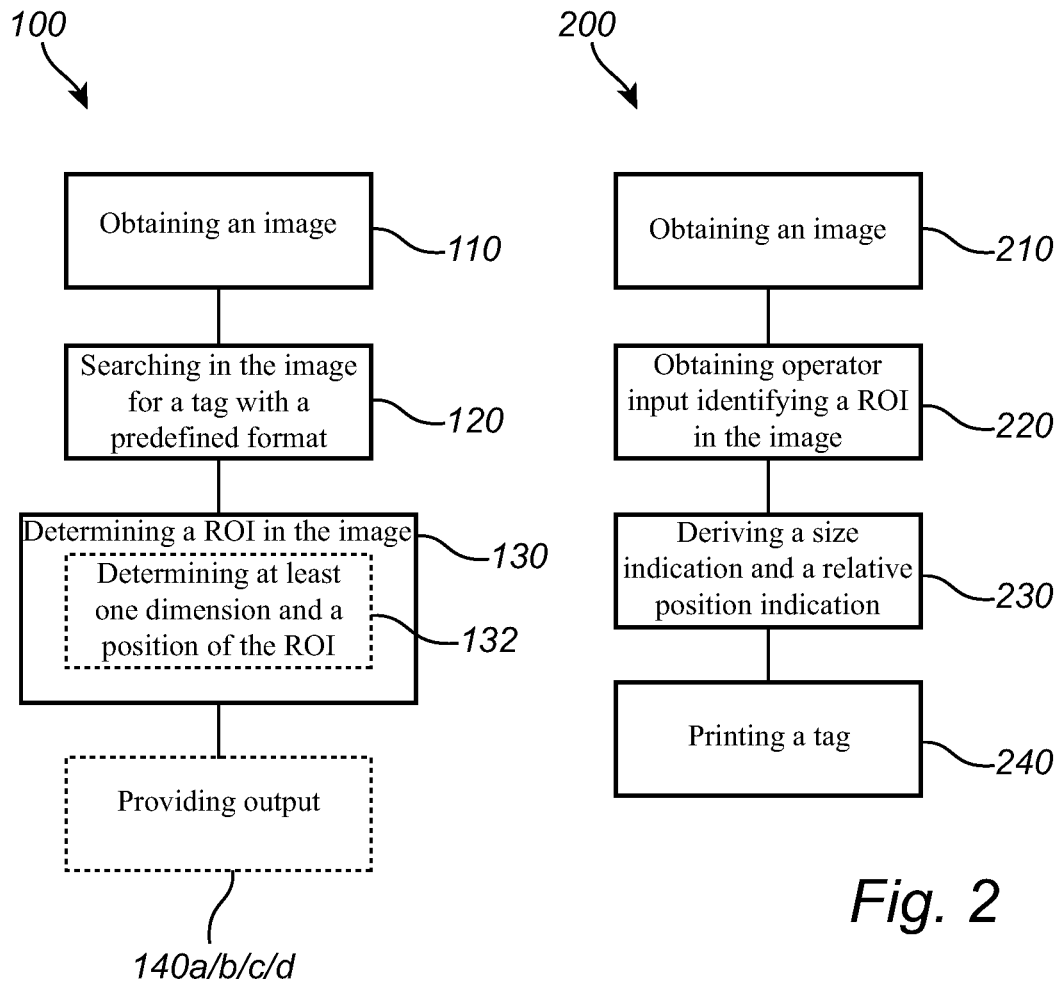

TAG FOR INDICATING A REGION OF INTEREST AND METHOD FOR FINDING A REGION OF INTEREST IN AN IMAGE

FIELD OF INVENTION

The present disclosure relates to the field of image processing and, in particular, to a method for finding a region of interest in a scene with moving objects.

TECHNICAL BACKGROUND

A region of interest (ROI) in an image can be specified in terms of a subarea of the field of view of a camera, video camera or other imaging device. Such a static specification is useful for monitoring or documenting events at a stationary location, such as the usage of a fixed resource or people visiting an area. If the purpose of the imaging is instead to monitor the position or activity of a moving object or person, the ROI may be defined with reference to that object or person. This is valid also in case of privacy masking, where the ROI refers to the absence of a legitimate monitoring interest, as is the case with human faces, keypads, vehicle license plates etc., and therefore needs to be removed from the acquired image when a contemporary high-resolution surveillance camera is in use.

U.S. Pat. No. 9,940,525B2 presents a technique for locking privacy masks to moving targets. More precisely, this document discloses a video surveillance system configured to look for objects and persons on which visual tags are attached, and to display obscurants over these. An obscurant may be an overlaid static pattern, or a copy of the original video data processed to be unrecognizable. The shape and size of the obscurant can be static or based on the distance between the video camera and the tag.

The available technologies for finding moving ROIs have not fully addressed the needs and wishes of the user community.

SUMMARY

Making available improved methods and devices for tag-based ROI finding would be beneficial. Proposing such an ROI finding that does not depend critically on accurate distance measuring would also be beneficial. It would also be beneficial to allow more precise control of the size, position and/or orientation of the ROI, and to make available ROI finding techniques that shall be suitable for the privacy masking; in this use case, it is attractive for the masking to disappear as soon as it is not needed. Finally, presenting ways to effectively prevent abuse of the tags would be an advancement in this technical field.

A first aspect relates to a method for locating a ROI in an image. The method comprises: obtaining an image; searching in the image for a tag which has a predefined format and which codes ROI information; and determining a ROI in the image on the basis of the tag's size and position in the image and the ROI information. The ROI information is readable by imaging the tag. It includes a size indication allowing the ROI's size to be determined relative to the tag's size, and a relative position indication allowing the ROI's position to be determined relative to the tag's position in the image.

Because the size of the ROI can be determined once the visible size of the tag is known, the first aspect relaxes the need for accurate distance measuring. Thanks to the relative position indication in the ROI information, the first aspect also affords better control of the position of the ROI.

In this disclosure, the term "tag" is synonymously with at least label, marker or sign.

Further, a "predefined format" relates to a set of graphic and other characteristics which are common to all tags and thereby allows a new tag to be recognized in an image. The graphical properties may include a shape, color, texture, or other coded information confirming to a viewer that a tag-like object is authentic. The predefined format does not specify all graphic characteristics of a tag but leaves room for the tag to code variable and possibly unique ROI information. In some embodiments to be described below, the predefined tag format specifies a physical size of the tag.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

A second aspect relates to a tag for indicating a ROI. The tag has a predefined format and codes ROI information. The ROI information is readable by imaging the tag. It includes a size indication allowing the ROI's size to be determined relative to the tag's size, and a relative position indication allowing the ROI's position to be determined relative to the tag's position in the image. Within the second aspect, there is furthermore provided a tag system comprising a plurality of tags with a common predefined format.

In a third aspect, there is provided a method for generating a tag with these characteristics. The method comprises: obtaining an image including a visible provisional tag of same physical size as the tag to be generated; obtaining operator input identifying a ROI in the image; deriving a size indication and a relative position indication from the image and the operator input, the respective indications allowing the ROI's size and position to be determined relative to the tag's size and position; and printing a tag, which codes ROI information including the derived size indication and relative position indication.

A fourth aspect of the present disclosure provides a device arranged to perform any of the above methods and furthermore provides a computer program for the same purpose. The computer program may be stored or distributed on a data carrier. As used herein, a "data carrier" may be a transitory data carrier, such as modulated electromagnetic or optical waves, or a non-transitory data carrier. Non-transitory data carriers include volatile and non-volatile memories, such as permanent and non-permanent storages of magnetic, optical or solid-state type. Still within the scope of "data carrier", such memories may be fixedly mounted or portable.

The second, third and fourth aspects involve—or contribute to—the same advantages as the first aspect. Embodiments of these aspects can be varied in similar ways.

BRIEF DESCRIPTION OF THE DRAWINGS

Aspects and embodiments are now described, by way of example, with reference to the accompanying drawings, on which:

FIG. 1 is a flowchart of a method for locating a ROI in an image;

FIG. 2 is a flowchart of a method for generating a tag indicating a ROI;

DETAILED DESCRIPTION

The aspects of the present disclosure will now be described more fully hereinafter with reference to the accompanying drawings, on which certain embodiments are shown. These aspects may, however, be embodied in many different forms and should not be construed as limiting; rather, the embodiments are provided by way of example so that this disclosure will be thorough and complete, and to fully convey the scope of all aspects to those skilled in the art. Like numbers refer to like elements throughout the description.

Figure 4:
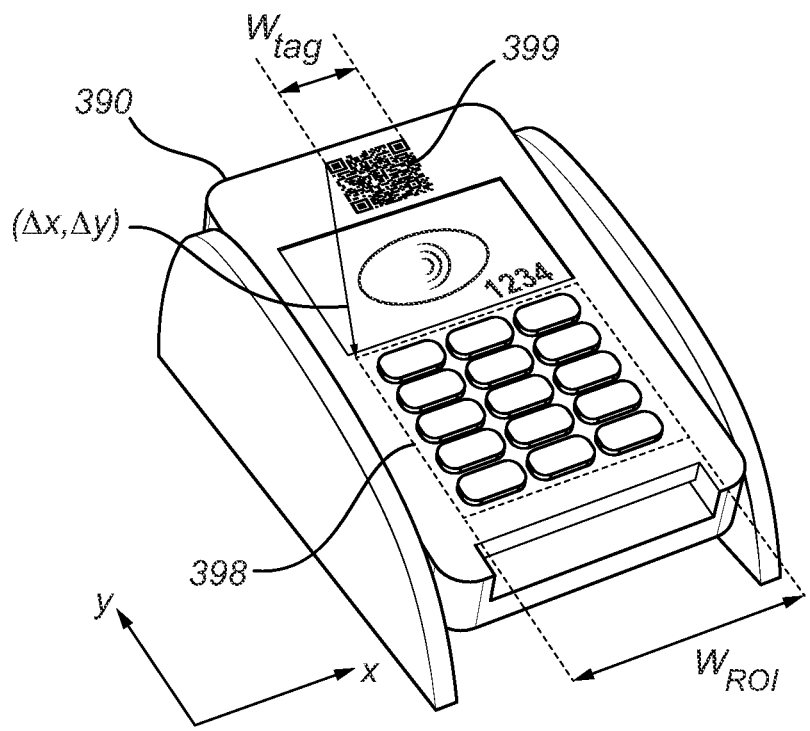
FIG. 4 is a detailed view of the same POS terminal carrying the tag, wherein the ROI shall cover the keypad.
Figure 5:
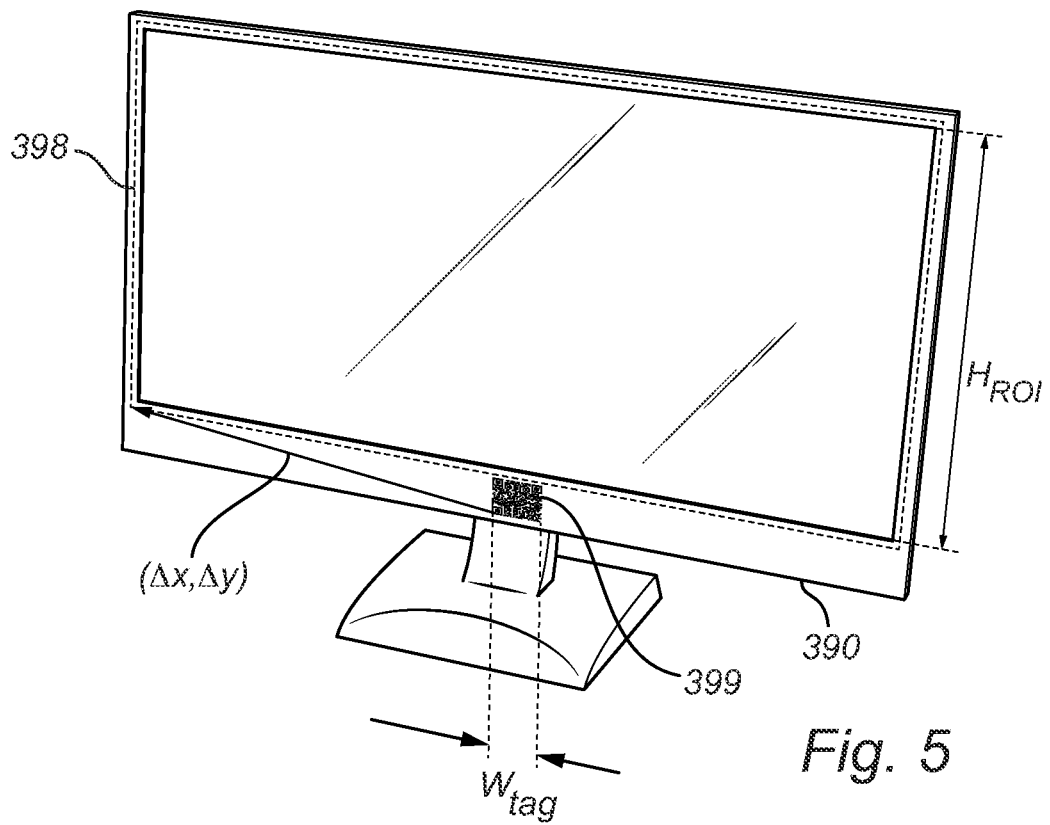
FIG. 5 shows a visual display carrying a tag, wherein the ROI shall cover the active display area.

FIGS. 4, 5 and 6 show example movable objects 390 which have been marked (tagged) using tags 399 of a predefined format in order to define ROIs 398 at or near these objects 390. The ROIs thus defined may cover the tagged objects 390 completely or partially, or they may be separate from the objects 390. The objects 390 may be physically movable relative other features of the imaged scene or may be moving apparently when the imaging angle changes. Further, a ROI 398 may correspond to a visual item in the depicted scene, and the tag 399 may be arranged such that it does not move relative to the visual item. For example, the ROI 398 may correspond to a portion of the tagged object, wherein the tag 398 is arranged such that it does not move relative to that portion.

In FIG. 4, the object is a POS terminal 390 of the type seen at store checkout areas and is equipped with a centrally located display window and a keypad below the display window. The POS terminal itself may be fixedly mounted, mounted on a movable arm or handheld. To authorize a card payment or contactless payment, a customer may be asked to enter a secret personal identification number (PIN) or other sensitive information using the keypad. Checkout areas are normally under video surveillance for crime prevention purposes, yet such surveillance must respect the privacy of the customers. Especially, the codes and other private information which the customer enters via the keypad must not be accessible by physical security staff or law enforcers, much less stored in memory.

One way to apply cropping, masking or other image processing that protects keypad from unauthorized inspection is to define a ROI 398 with the approximate location shown in FIG. 1. Security considerations suggest that the ROI 398 should not be larger than necessary, nor should it remain active when a person or object enters in front of the POS terminal 390. The way of defining the ROI should also be easily adaptable to future or alternative designs of the POS terminal 390.

The inventors have realized that these requirements can be adequately addressed by arranging a tag 399 which at once serves as a position indication and codes a size indication and a relative position indication relating to the ROI 398. In the present disclosure, these indications are denoted L1 and L2, respectively, and will be collectively referred to—together with any additional indications—as ROI information. The coding may be in accordance with a one-dimensional (linear) or two-dimensional (matrix) barcode system, such as EAN, UPC, 16K, QR, Aztec, Data Matrix, DotCode, HCCB, photoTAN, PDF417, SnapTag, AprilTags and SPARQCode. By arranging the tag 399 above the display window of the POS terminal 390, the tag 399 is reasonably protected from being inadvertently obscured by a customer's hand, which would deactivate the ROI 398 and thus the privacy protection temporarily.

The size indication L1 may be a ratio of the ROI's 398 size and the tag's 399 size. In this connection, it is immaterial whether "size" refers to a physical size (in length or area units, such as 1 m or 1 m$^2$) or an apparent size which the tag occupies in an image (expressed as subtended angle, numbers of pixels, percentage of the field of view, or equivalent metrics). The size of the ROI 398 and tag 399 may refer to one of their dimensions according to a predefined selection (e.g., width, height, depth, diagonal, diameter), a dimension of a bounding box, a length of a characteristic visual feature, an area or another equivalent value allowing correct scaling of the ROI 398. It may be especially convenient to express the size in terms of a bounding box or a characteristic visual feature in cases where the ROI 398 has an irregular or complex shape, like the ROI geometry in FIG. 6A. When the size indication L1 is a ratio, then conceptually the size of the ROI 398 is expressed in units of the tag's 399 size, i.e., as multiples of the tag's size 399. Referring to FIG. 4 and using the x dimension (width) as size metric, one may have $W_{ROI} = L1 \times W_{tag}$.

Alternatively, the size indication L1 may include the ROI's 398 physical size (in length or area units, such as 1 m or 1 m$^2$). There are at least two ways to enable the correct scaling: the size indication L1 may further include an indication of the tag's 399 physical size or, alternatively, the predefined format of the tag may specify the physical size of the tag 399. Either way, the physical size of the tag 399 is known, so that the length or area scale of an image of the tag 399 can be determined. In a simple case, the length scale may be a constant ρ indicating the physical length, width or area of a pixel of the image.

Under oblique viewing angles, the image normally has a perspective distortion. In this case, it may be convenient to estimate a homography H (rectification homography) from p, the location in the image of the corners of the tag 399, whose physical size is known. The vanishing points are constructed on the basis of parallel edges of the tag 399. The image coordinates p' of the rectified tag are computed using the homography as p'=Hp. When the image coordinates p' of the rectified tag are known, the ROI information coded by the tag 399 is used to compute the image coordinates of the (rectified) ROI 398. Next, the perspective-distorted ROI is computed from the rectified ROI 398 by applying H$^{-1}$, the inverse homography. Accordingly, the use of the homography H and its inverse H$^{-1}$ ensures correct scaling at the same time as it handles the perspective distortion.

The relative position indication L2 may include an offset between the tag's 399 physical position and the ROI's 398 physical position. The offset may be expressed as multiples of a size of the tag 399, or the offset may be in physical units (e.g., 1 m) if the tag's physical size 399 is available as part of the predefined format or specified in the size indication L1. If the tag 399 and ROI 398 have different shapes, definiteness may require a convention that the offset shall be defined with respect to a reference point, such as the upper left corner of the shape (or the shape's bounding box) or the center. The relative position indication L2 may include multiple components corresponding to different coordinate axes of a reference frame. The orientation of the reference frame may be determined by the orientation of the tag 399; the orientation is detectable at least if the tag 399 includes a barcode, QR code or other visual feature with a detectable orientation.

With reference to the orthogonal x, y physical coordinate axes shown in FIG. 4, the relative position indication L2 may include an offset approximately equal to (Δx, Δy)=(−1, −3) in units of the tag's 399 width $W_{tag}$. Under a convention that the offset vector shall connect the upper left corners of the tag 399 and ROI 398 and with knowledge of the value of L1 in $W_{ROI}=L1 \times W_{tag}$, this offset allows the image coordinates of the upper boundary of the ROI 398 to be computed uniquely. The further boundaries of the ROI 398 can be computed from a height/width ratio of the ROI 398 or, alternatively, from a further field in the size indication L1 that relates the height of the ROI 398 to a dimension (height, width, diagonal etc.) of the tag 399. The height/width ratio of the ROI 398 may be pre-specified or otherwise included as a shape indication L4 within the ROI information that the tag 399 codes.

Because the content of the encoded size indication L1 and relative position indication L2 can be varied while the tag 399 remains fully compliant with the predefined tag format, this embodiment is easy to adapt to future or alternative designs of the POS terminal 390 and to other products. Furthermore, in a hypothetic situation where the information shown in the display window was to be regarded as private, it is easy to extend the ROI 398 to cover also the display window by modifying the size and relative position indications L1, L2.

As an alternative to a physical tag 399 (e.g., an adhesive label), an imaginary tag 399 can be displayed in a portion of the display window at times when the customer is requested to enter a secret code through the keypad. Such tag displaying can be achieved by a relatively simple reconfiguration of software in the POS terminal 390. Added benefits include more complete coverage of the video surveillance; no need to reserve space on the POS terminal's 390 surface for tagging; less sensitivity of the tag 399 to stealing or unauthorized copying.

In FIG. 5, the object to which the tag 399 is attached is a movable visual display 390. The ROI 398 shall correspond as accurately as possible to the active display area. One potential use case is video surveillance of a public workspace where the screen content is to be excluded from surveillance in the interest of privacy; locating the ROI 398 is nontrivial if a movable video camera is used, such as a pan-tilt-zoom (PTZ) camera. Further, aging and fatigue of the mechanical components as well as environmental vibrations gradually detract from the initial mounting accuracy. Another use case where the tagging shown in FIG. 5 may be useful is the recording of an instruction video for a touchscreen operated software, wherein the screen content needs to be clearly visible together with the instructor's hand. To avoid aliasing and other disturbing artefacts, special image processing or pixel substitution may be applied in the active display area.

The location of the ROI 398 is indicated by attaching a tag 399 to the visual display's 390 surface. This way, the tag 399 is movable with the object 390, that is, it follows all movements of the visual display 390. Especially, the tag 399 follows the movements of the object portion to which it is attached, that is, the upper part of the visual display 390, regardless of any movements of the lower part (foot) relative to the upper part.

The attached tag 399 codes ROI information including a size indication L1 and a relative position indication L2. As explained above, the size indication L1 may for example include a size of the ROI 398 in physical units or in units of the size of the tag 399. For example, the size indication may be a ratio of the ROI's 398 height to the tag's 399 width, $L1=H_{ROI}/W_{tag}$. The relative position indication L2 may include a vector (Δx, Δy) connecting reference points on the tag 399 and ROI 398, as illustrated in FIG. 5.

Optionally, the ROI information may further include an orientation indication L3 relating to the ROI 398. The orientation indication L3 indicates the orientation of the ROI 398 relative to the orientation of the tag 399, e.g., an angle of an imaginary rotation for aligning the ROI 398 and the tag 399. This may allow the extent of the ROI 398 to be very precisely defined and/or compensate any positioning errors affecting the tag 399. If no orientation indication L3 is included in the ROI information, it may be pre-agreed that the ROI 398 shall be aligned with the tag 399 or shall be aligned with the image in which the ROI 398 is defined. When the ROI information of a tag 399 includes an orientation indication L3, it may be advantageous to attach the tag 399 to the object's 390 surface in a non-rotatable fashion. Furthermore, the tag 399 should include an orientable pattern, which may exclude certain types of circular barcodes.

Further optionally, the ROI information may include a shape indication L4 relating to the ROI 398. The shape indication L4 specifies, for example, an aspect ratio of the rectangular ROI 398. If the tag 399 belongs to a tag system conceived to be applicable to generic objects 390, in which the tags comply with a common format, the shape indication L4 may assume values indicating different regular shapes, e.g., rectangles, ellipses, ovals or general polyhedrons, or values indicating irregular shapes. The description of an irregular shape may require more data than can be reliably coded by a tag 399; instead, the shapes may be pre-stored in a database accessible by an executing instance of ROI locating software as vector graphics or bitmaps indexed by a short number that fits in a tag 399.

Alternatively, though this may limit the tag system's applicability to other objects, it may be pre-agreed that the ROI 398 shall be centered on the tag 399 in the horizontal dimension. This removes the need to include an Δx component of the offset vector and so reduces the size of the relative position indication L2 in the ROI information.

Figure 6A:
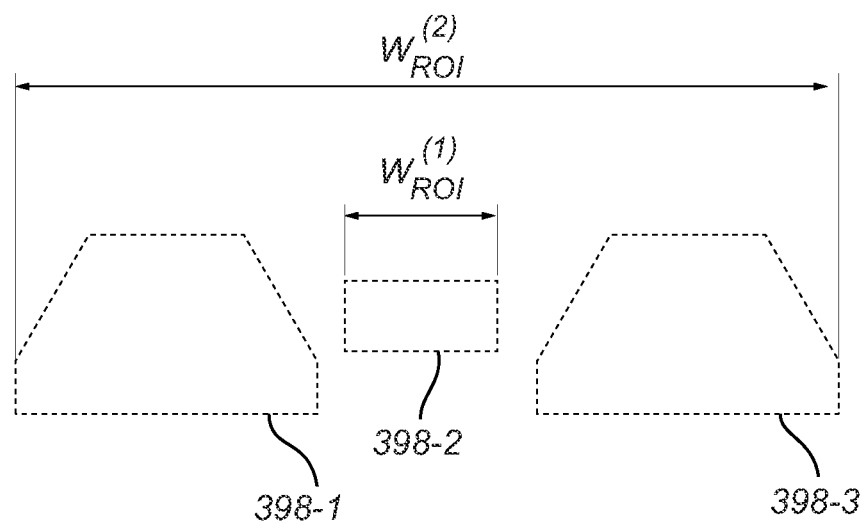
FIG. 6A shows a template for a ROI with three disjoint subregions.
Figure 6B:
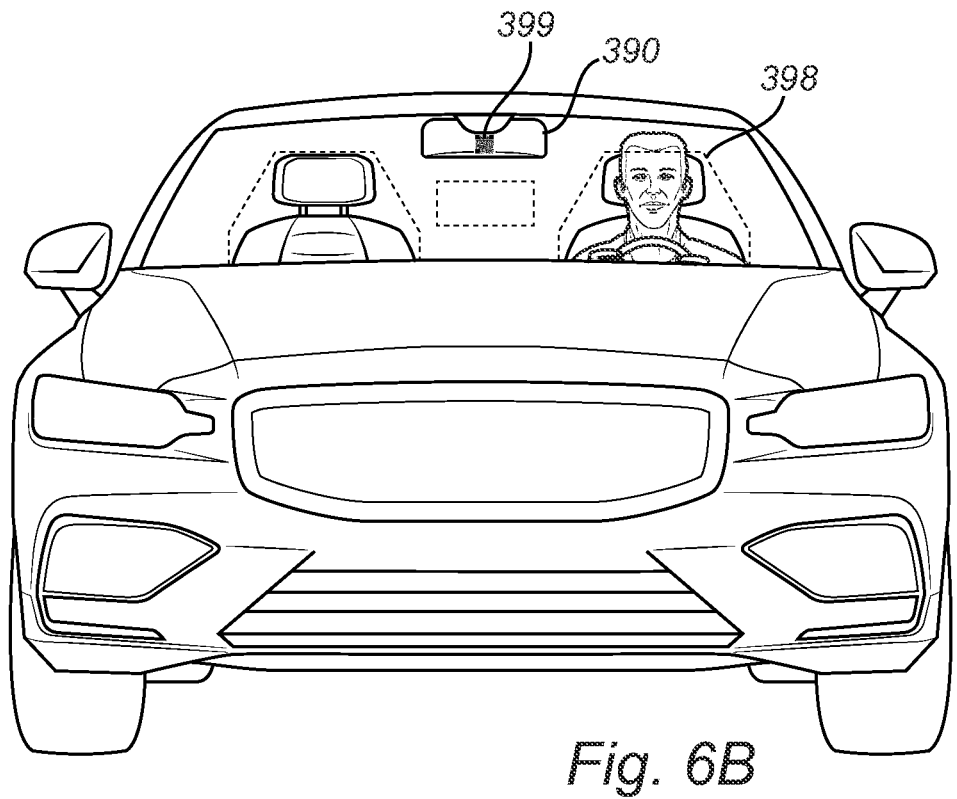
FIG. 6B shows the sample template applied to a frontal image of a vehicle, such that the driver and any passengers are covered by the ROI.

FIGS. 6A and 6B illustrate a use case with an irregularly shaped ROI 398 for use with a system for frontal imaging of a vehicle. The imaging system may for example be included in a roadside installation. It is assumed here that the ROI 398 shall correspond to the image portion occupied by the front-seat travelers and any further passenger in the center back seat who is visible through the windscreen. The ROI 398 may either be used to guide imaging or visual identification of the travelers or, conversely, to apply masking in the interest of privacy. FIG. 6A shows a ROI template composed of three subregions 398-1, 398-2, 398-3, which may have pre-specified relative sizes and/or pre-specified relative positions. For example, the ROI template may be pre-stored, together with an identifier, as a bitmap or a scalable vector graphics object in a database.

FIG. 6B illustrates two example ways of measuring the size of a ROI 398 generated on the basis of the template. On the one hand, the width $W_{ROI}^{(1)}$ of the center subregion 398-2 may be adopted as the characteristic length. On the other hand, one may use the total width $W_{ROI}^{(2)}$ of the ROI, which corresponds to the width of a bounding box of the three subregions 398-1, 398-2, 398-3. A length one of these widths $W_{ROI}^{(1)}$, $W_{ROI}^{(2)}$, in physical units or relative units (ratios), is included in the size indication L1.

A relative position indication L2 may be included in the ROI information of the tag 399. The relative position indication L2 may be expressed as a one- or two-component offset, like those described with reference to FIGS. 4 and 5. Alternatively, the relative position indication L2 refers to a reference point (not shown) in the ROI template which shall coincide with a point of the tag 399, such as the center. The reference point of the ROI template may be stored directly in the bitmap or vector graphics object representing the template, or may be included in a separate layer thereof.

FIG. 6B is a frontal image of a vehicle with an overlaid ROI 398, which can be located in accordance with the indications coded by a tag 399 attached to the front-facing side of a rear-view mirror, which is visible through a portion of the windscreen. If the imaging system is only required to produce useful images of four-wheeled vehicles traveling on a road segment with a known inclination, sufficient alignment of the ROI 398 may be achieved without an absolute need to include an orientation indication L3 in the ROI information.

Turning now to FIG. 1, a method 100 for locating a ROI 398 will be described next. The method 100 is preferably computer-implemented. It may for example be implemented in the device 300 shown in FIG. 3, which comprises an input interface 320 for receiving an image, processing circuitry 310, 312, and an output interface 330. The input interface 320 may be connected to an imaging device 340, not forming part of the device 300, such as a camera or video camera arranged to capture electromagnetic waves in visible or invisible wavelength ranges. The imaging device may be directed at a scene in which may be visible different objects 390, 391, 392 and a tag 399 for indicating a ROI 398. Alternatively, the input interface 320 is connected to a local or networked memory or a communication network.

As a first step 110 of the method 100, an image is obtained. The image may have been acquired using visible light or invisible light. A tag 399 which can be discerned only using invisible light, such as infrared or ultraviolet, may disturb the appearance of the tagged object 390 to a lesser extent. The image may be an isolated image. Alternatively, the image is a frame in a video sequence or in a live video sequence.

In a second step 120 of the method 100, the image is searched for the presence of any tag 399 that complies with a predefined format. As already mentioned, the predefined format may specify one or more graphic characteristics which are common to all tags of a tag system that the device 300 is configured to recognize. To mention one specific example, the tracking boxes (hollow squares) at three corners of a QR code in the tag 399 may provide the required recognizability, while leaving the color and size variable and potentially information-carrying. The size of the tag 399 may be relied upon to define the size of the ROI 398 to be determined, as exemplified above. In the second step 120, further, the ROI information coded by the tag 399 is extracted from the image operation occupied by the tag. The ROI information includes at least a size indication L1 and a relative position indication L2, allowing the ROI's size and position to be determined relative to the tag's size and position.

The execution of the method 100 then proceeds to third step 130 of determining a ROI 398 in the image. The determination is based on the tag's size and position in the image, which are expressible in image coordinates X, Y, and the ROI information. The ROI 398 is preferably expressed in image coordinates X, Y or a different format which is deemed suitable in view of the processing steps further downstream. For example, if the image is going to be rendered at a different resolution, it may be convenient to output the boundaries of the ROI 398 in relative coordinates, which refer to fractions of the image dimensions. The step 130 of determining the ROI 398 in the image may include determining 132 at least one dimension and a position of the ROI in the image on the basis of the size indication L1 and the relative position indication L2. This determination 132 may be guided by the further fields of the ROI information, such as an orientation indication L3 or a shape indication L4, or both.

The output of the method 100 may be provided in one or more of the following forms.

As a first option, the method 100 outputs 140*a* the initially obtained image after image data in the determined ROI 398 has been processed. The processing may aim at enhancing the visibility of features in the ROI 398. Alternatively, the processing applies blurring or other processing that renders visual features less recognizable. Under this option, it is not mandatory to output data specifying the extent of the ROI 398 itself.

A second option is to output 140*b* rendering data specifying the determined ROI. This way, the processing or masking can be delegated to a trusted third party independent of the device 300, or even deferred to playback entrusted to such third party. It may be noted that the rendering data is independent of the image data in the video sequence, so that the third party need not repeat the present method 100, nor have access to the original image data. For example, the rendering data may specify the boundaries of the ROIs 398 in image coordinates (pixels) or relative coordinates expressed as fractions of the image size.

According to a third possible option, the method 100 may output 140*c* events in the determined ROI 398. The events may relate to motion of objects in the ROI 398 to be visualized.

According to a fourth option, the image is output 140*d* after removing or replacing image data in the determined ROI 398. On the one hand, visual features in the ROI 398 may be removed. For example, an area corresponding to the ROI 398 may be cropped or trimmed, and the image data therein permanently removed from the image. This is especially suitable for the use case of privacy masking, as a receiving party could otherwise gain unauthorized access to the portions which the ROI information in the tag 399 specifies for masking, namely, by disabling the masking functionality at image displaying or video playback. Overlaying of a static masking pattern, wherein the original image data in the ROI 398 is replaced by the masking pattern, may provide an equal level of privacy. The area corresponding to the ROI 398 and the static masking pattern may be extended by a safety margin, so as to avoid incomplete masking of the sensitive information.

Figure 3:
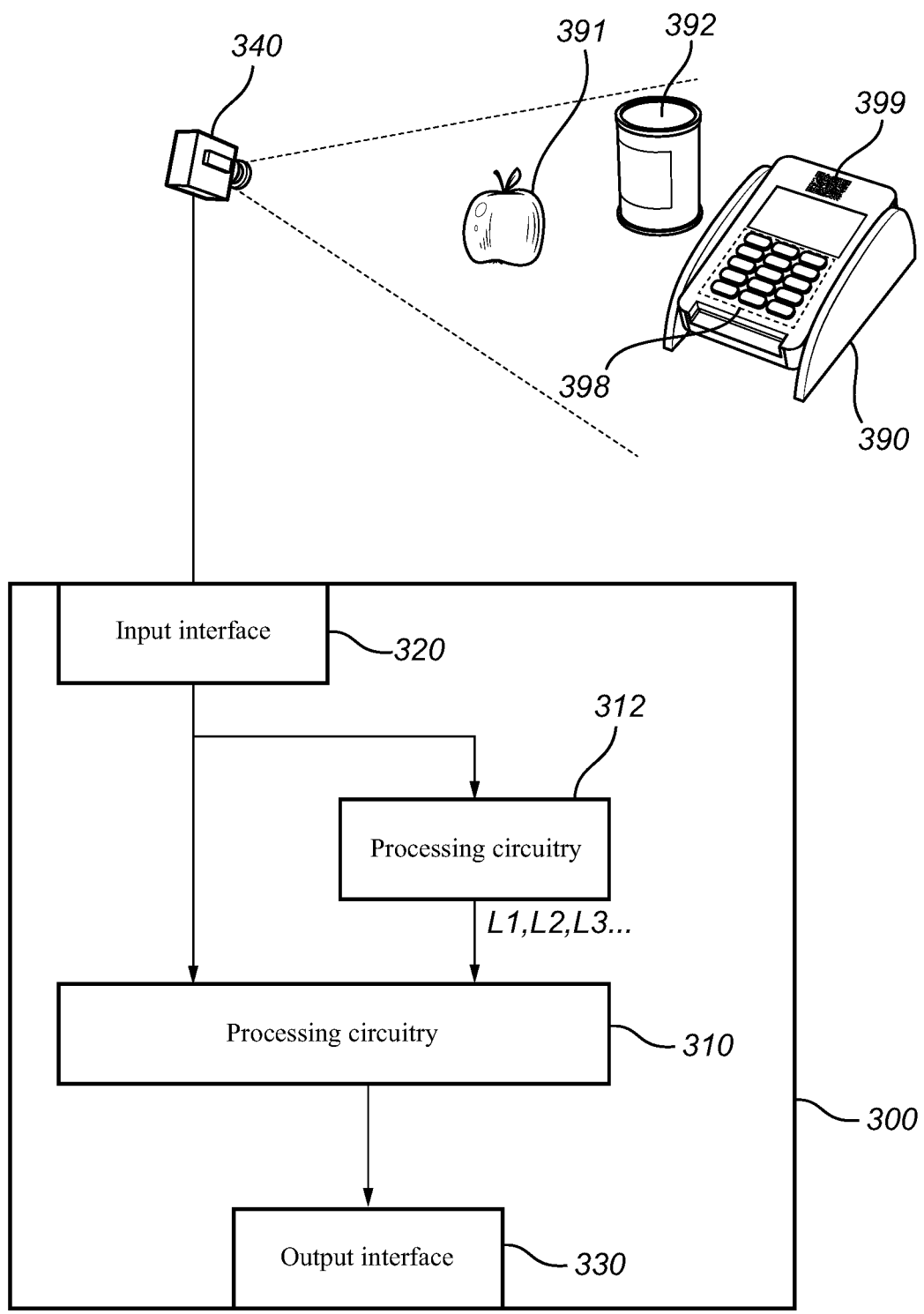
FIG. 3 shows an imaging system configured to locate at least one ROI with the aid of a tag attached to a point of sale (POS) terminal visible in the image.

Returning to the device 300 shown in FIG. 3, it is understood that the output interface 330 outputs the output data according to one of the four options described just above, in a format ensuring the necessary interoperability with an entity located downstream in a processing chain. For the purpose of implementing the method 100, it may be computationally efficient to include barcode decoding circuitry 312 as a dedicated section of the processing circuitry. The barcode decoding circuitry 312 may execute a suitable algorithm, such as a Reed-Solomon error correction algorithm in the case of a QR code, to extract the ROI information with its various fields L1 (size indication), L2 (relative position indication), L3 (orientation indication), L4 (shape indication) and others. A main part 310 of the processing circuitry receives from the barcode decoding circuitry 312 the ROI information and the input interface 320 the image from in which the tag 399 is visible. The main part 310 of the processing circuitry is thereby enabled to determine 130 the ROI 398 in the image.

FIG. 2 is flowchart of a method 200 for generating a tag 399 which codes ROI information in accordance with operator input. The operator input may be high-level input or non-technical input, namely, in the sense that nothing more is required from the operator than to merely indicate a desired extent of the ROI as seen in an image. The automated procedure according to the method 200 derives correct ROI information from the operator input.

In a first step 210 of the method 200, an image is obtained which includes a visible provisional tag which has a physical size equal to the tag to be generated and which is compliant with the same predetermined tag format. A "provisional tag" in this sense may be a dedicated placeholder tag coding generic information only, or may be a tag generated in accordance with the same format, wherein the tag's coded information is disregarded for the purpose of the present tag generating method 200. The provisional tag may be temporarily attached to an object which is—or is of same type as—the object which will carry the tag 399 to be generated.

In a second step 220, operator input which identifies a desired ROI in the image is obtained. The operator, which can be a human operator possibly supported or replaced by a machine-learning engine, may identify the ROI 398 by annotating the image with markers using a graphical user interface, or may alternatively input commands or coordinates indicative of the ROI boundary. For the operator's convenience, the ROI 398 may be identified in a version of the image that has been transformed by rotation, zooming, tilt-shifting and the like. This may allow the operator to identify the ROI 398 with high accuracy in all areas of the image, even those which the imaging acquisition (e.g., camera optics) has subjected to locally strong projective deformations.

In a third step 230, a size indication L1 and a relative position indication L2 are derived from the image and the operator input. The size indication L1 allows an entity reading the generated tag to determine the ROI's 398 size relative to the generated tag's 399 size, and the relative position indication L2 allows the entity to determine the ROI's 398 position relative to the generated tag's 399 position. Execution of the following substeps will return the size indication L1 and a relative position indication L2 in relative coordinates:
i) Collect image coordinates which define the respective extents of the ROI 398 and the provisional tag in the image.
ii) From the collected image coordinates, calculate the size $s_{ROI}$ of the ROI 398 and the size $s_{tag}$ of the provisional tag. For interoperability, the size is measured in a manner which has been pre-agreed with entities that are to read the generated tag 399.
iii) Store the ratio of the sizes as the size indication, $L1 = s_{ROI}/s_{tag}$.
iv) Define a reference point on the ROI 398 and a reference point on the provisional tag. For this purpose, the method 200 may apply a pre-agreed convention for reference point finding.
v) From the collected image coordinates, calculate a vector $(\Delta X, \Delta Y)$ connecting the defined reference points. Optionally, the vector is transformed to a local reference frame of the provisional tag.
vi) Normalize the vector components by the size $s_{tag}$ of the provisional tag and store as components of the relative position indication, $L2_x = \Delta X/s_{tag}$, $L2_y = \Delta Y/s_{tag}$.

The indications L1, $L2_x$, $L2_y$ are included in the ROI information of the tag 399 to be generated.

In a fourth step of the method 200, the ROI information is coded in accordance with the predefined tag format, such as a linear or matrix barcode format, and the tag 399 is printed. The printed tag 399 can be attached at the same location as the provisional tag has occupied, e.g., on an object 390. More accurate positioning may be achieved if the printed tag 399 is attached exactly on top of the provisional tag and with same orientation.

The method 200 for generating a tag is preferably automated or computer-implemented. With minor modifications, the device 300 described with reference to FIG. 3 can be utilized to execute the method 200. More precisely, since the information coded by the provisional tag is to be disregarded, the dedicated barcode decoding circuitry 312 is not necessary; it may be inactivated while the device 300 is executing the method 200 for generating a tag. Furthermore, the output interface 330 is preferably adapted to communicate with a printer (not shown) and instruct the printer to produce the tag, according to the fourth step 240.

An optional feature of the various aspects of this disclosure is to include a copy protection code L5 in the ROI information. The copy protection code L5 forestalls a scenario where an unauthorized person, who does not wish to be recognizable in surveillance imagery, steals or copies a tag 399 which indicates a ROI 398 in which privacy masking shall be applied. The person could then attach the stolen or copied tag 399 to a garment, enter the surveyed premises and commit further unlawful acts unseen.

The copy protection code L5 may be a visual characteristic of the ROI 398 which the tag 399 is meant to indicate. Generic categories of visual characteristics which can be recognized by a computer vision system—such as keypad, flooring, shelves, face, car license plate—may be used for this purpose. The method 100 may then be extended with a step of verifying that the determined ROI has indeed the expected visual characteristics specified by the copy protection code L5, or otherwise cause the privacy masking to be interrupted.

In another option, the copy protection code L5 includes a tag identification number. The tag identification number may be unique across all tags of a tag system. Alternatively, the tag identification number is unique across all tags in use in a store, shopping mall or other limited space where a stolen or copied tag would be likely to circulate. The tag identification number can then be used, on the one hand, for revocation when a tag is discovered as stolen. The discovery of stolen tags may be automated, e.g., by configuring each individual surveillance camera or group of surveillance cameras with software that maintains a list of all recently seen tag identification numbers and assesses regularly whether one of the numbers disappears. An operator may be requested to acknowledge each of such disappearances as being intentional, failing which the disappeared tag identification number may be revoked. Revocation of the tag number may mean that the tag does no longer generate a masking ROI. Alternatively or additionally, the spotting of a tag coding a revoked number by a surveillance camera may trigger a security alert guiding security staff towards the misappropriated tag.

On the other hand, the inclusion of a nominally unique tag identification number may be used to discover illicit copies of a tag. This may be achieved by configuring a group of surveillance cameras (e.g., all cameras in use within a store, shopping mall or other area where the copied tag would be likely to circulate) to report to a central database all tag identification numbers which are being observed in a given timespan. The occurrence of duplicates in the central database suggests that unauthorized copying has taken place. An appropriate response to a finding of a tag with a duplicated tag identification number is to revoke this number, so that it no longer defines a privacy masking ROI, and replace the copied tag with a freshly generated tag that codes a different tag identification number.

The aspects of the present disclosure have mainly been described above with reference to a few embodiments. However, as is readily appreciated by a person skilled in the art, other embodiments than the ones disclosed above are equally possible within the scope of the disclosure, as defined by the appended patent claims.

The invention claimed is:

1. A method for locating a region of interest (ROI) in an image, comprising:
   obtaining the image, wherein the image contains a physical object;
   searching in the image for a tag that is attached to the physical object, wherein the tag includes encoded ROI information;
   decoding the ROI information encoded in the tag to extract a size indication and a relative position indication, the size indication and the relative position indication allows a size of the ROI and a position of the ROI to be determined relative to a size of the tag and a position of the tag on the physical object;
   determining the ROI in the image expressed in image coordinates, wherein the ROI is determined based on the size of the tag and the position of the tag in the image, which are expressed in the image coordinates, and based on the ROI information; and
   outputting the image after removing or replacing image data in the ROI,
   wherein the size indication includes a ratio of a dimension of the ROI and a dimension of the tag, such that the dimension of the ROI, in the image coordinates, is obtained by multiplying the ratio by the dimension of the tag in the image coordinates.

2. The method of claim 1, wherein the relative position indication includes an offset between a physical position of the ROI and physical position of the tag.

3. The method of claim 1, wherein determining the ROI includes determining the dimension of the ROI and the position of the ROI in the image based on the size indication and the relative position indication.

4. The method of claim 1, wherein the ROI information further includes at least one of an orientation indication relating to the ROI or a shape indication relating to the ROI.

5. The method of claim 1, wherein the ROI information further includes a copy protection code, such as a visual characteristic of the ROI or a tag identification number.

6. The method of claim 1, wherein the tag is movable together with an object which is visible in the image, and the ROI includes a portion of the object.

7. The method of claim 1, further comprising at least one of:
   outputting rendering data specifying the ROI; or
   outputting events in the ROI.

8. The method of claim 1, wherein the ROI is a masking region.

9. The method of claim 1, wherein the image is a frame in a video sequence or live video sequence.

10. The method of claim 1, wherein the tag comprises a graphic that includes the encoded ROI information.

11. A device comprising processing circuitry arranged to:
   obtain an image, wherein the image contains a physical object;
   search in the image for a tag that is attached to the physical object, wherein the tag includes encoded region of interest (ROI) information,
   decode the ROI information encoded in the tag to extract a size indication and a relative position indication, the size indication and the relative position indication allows a size of the ROI and a position of the ROI to be determined relative to a size of the tag and a position of the tag;
   determine the ROI in the image expressed in image coordinates, wherein the ROI is determined based on the size of the tag and the position of the tag in the image, which are expressed in the image coordinates, and based on the ROI information, and
   output the image after removing or replacing image data in the ROI,
   wherein the size indication includes a ratio of a dimension of the ROI and a dimension of the tag, such that the dimension of the ROI, in the image coordinates, is obtained by multiplying the ratio by the dimension of the tag in the image coordinates.

12. A non-transitory computer readable recoding medium comprising a computer program comprising instructions which, when the computer program is executed by a computer, cause the computer to carry out a method for locating a region of interest (ROI) in an image, the method comprising:
   obtaining the image, wherein the image contains a physical object;
   searching in the image for a tag that is attached to the physical object, wherein the tag includes encoded ROI information;
   decoding the ROI information encoded in the tag to extract a size indication and a relative position indication, the size indication and the relative position indication allows a size of the ROI and a position of the ROI to be determined relative to a size of the tag and a position of the tag on the physical object;
   determining the ROI in the image expressed in image coordinates, wherein the ROI is determined based on the size of the tag and the position of the tag in the image, which are expressed in the image coordinates, and based on the ROI information; and
   outputting the image after removing or replacing image data in the ROI,
   wherein the size indication includes a ratio of a dimension of the ROI and a dimension of the tag, such that the dimension of the ROI, in the image coordinates, is obtained by multiplying the ratio by the dimension of the tag in the image coordinates.

* * * * *